United States Patent [19]

Koenig

[11] 4,210,98

[45] Jul. 8, 19!

[54] FISHING APPARATUS

[76] Inventor: Burton G. Koenig, 807 Avenue C, Bayonne, N.J. 07002

[21] Appl. No.: 876,877

[22] Filed: Feb. 13, 1978

Related U.S. Application Data

[63] Continuation-in-part of Ser. No. 621,648, Oct. 14, 1975, abandoned.

[51] Int. Cl.² ............................................. A44B 17/00
[52] U.S. Cl. ............................... 24/201 HE; 43/42.09
[58] Field of Search ..... 24/201 HE, 201 BN, 201 BS, 24/230.5 AD, 226, 75, 187, 201 HH, 206 R; 43/44.83, 42.09, 42.38, 42.5, 42.52, 43.1, 42.74, 44.84, 44.85, 44.86, 44.96, 44.98, 42.8, 42.15, 42.08, 43.15, 44.92; 248/339; 403/393

[56] References Cited

U.S. PATENT DOCUMENTS

| 644,080 | 2/1900 | Huebel | 248/223 |
|---|---|---|---|
| 691,915 | 1/1902 | Robertson | 24/226 |
| 1,205,247 | 11/1916 | Munroe | 24/206 R |
| 1,793,836 | 2/1931 | Burns | 24/75 |
| 2,313,572 | 3/1943 | Nungesser | 43/42 |
| 3,675,358 | 7/1972 | Jones | 43/42 |

FOREIGN PATENT DOCUMENTS

| 334455 | 10/1919 | Fed. Rep. of Germany | 24/ |
| 463292 | 8/1928 | Fed. Rep. of Germany | 47/ |

Primary Examiner—J. Franklin Foss
Attorney, Agent, or Firm—Gloria K. Koenig

[57] ABSTRACT

A fishing apparatus for quickly and safely connecti and disconnecting the upper end of the leader to a from the fishing line, respectively, comprising a ba plate to be attached to the fishing line, a semi-rigid frc plate, means for releasably securing the front plate the back plate, the lower end of the front plate exten ing below the lower end of the back plate to provide area which can be grasped to attach or to remove t front plate to or from the back plate, respectively, a a hole provided through the lower end of the front pl: to which lures, hook and bait can be directly attach or to which a section of line can be attached with t lures, hook and bait attached to the end of the line.

1 Claim, 10 Drawing Figures

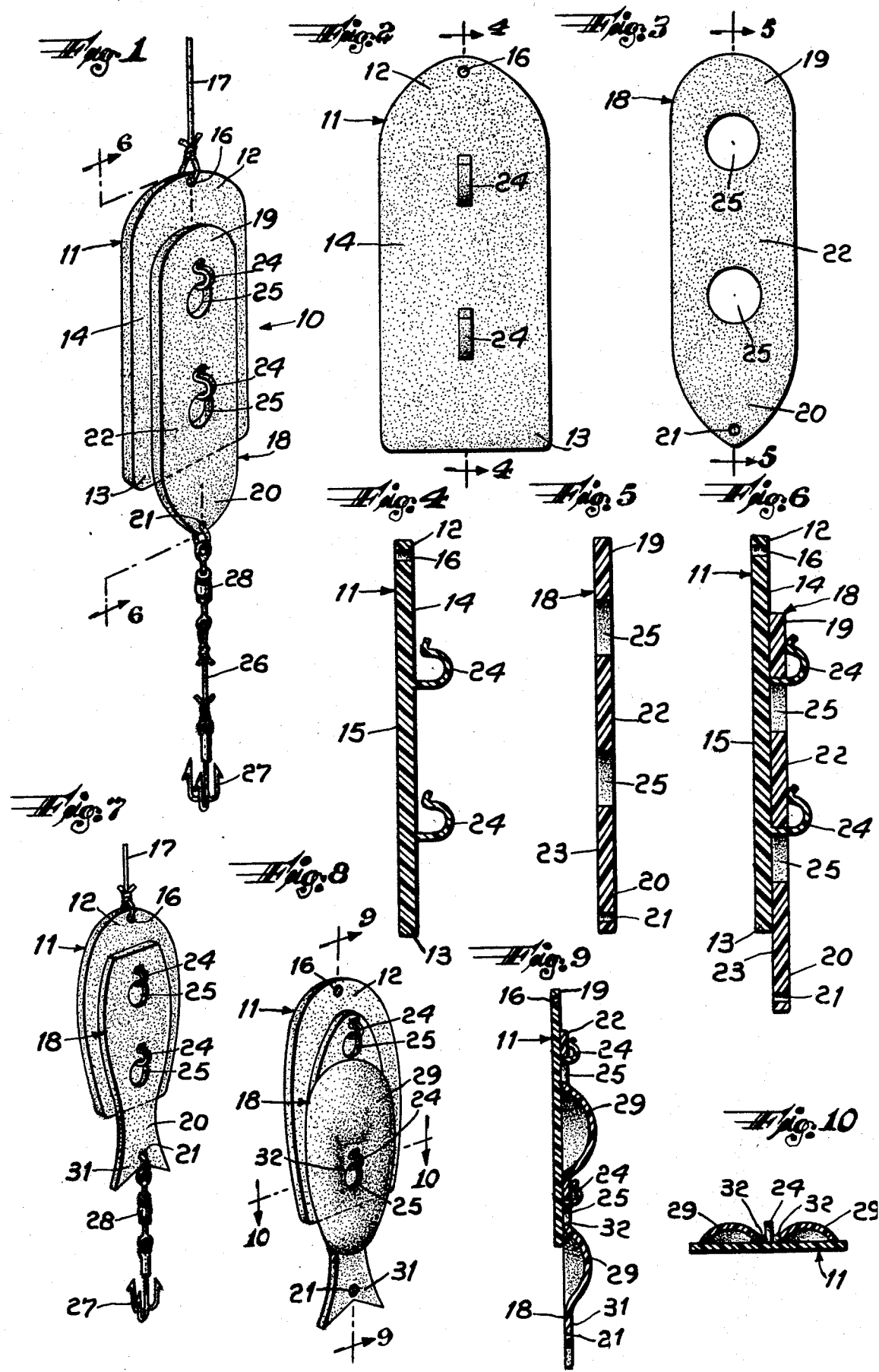

FISHING APPARATUS

CROSS REFERENCE

This application is a continuation in part of pending application Ser. No. 621,648 filed Oct. 14, 1975 now abandoned.

BACKGROUND (1) Field of Invention

This invention relates to a fishing apparatus for use as an attachment to any type of fishing line to provide a means to quickly disconnect the leader from the fishing line without removing the fish hook from the mouth of a fish and without the use of tools.

A back plate is attached to the fishing line. A front plate, to which the lure, bait and hook are attached or to which an additional length of line with lure, bait and hook are attached, is releasably secured to the back plate. When a fish is caught, the fisherman detaches by finger pressure the front plate from the back plate and replaces it with another front plate equipped with the accessories of his choice. After the fish has stopped wriggling the hook can be removed from its mouth without danger to the fisherman of injury from the hook. In practice, the fisherman would attach a back plate to his line and have a stock of pre-baited and lured front plates on hand to use as he caught fish. At a later time he could remove the fish from the hook with the front plate attached.

(2) Description of the Prior Art

One of the practical difficulties experienced by fishermen is the rapid removal of the hook from the mouth of a wriggling fish which has just been caught. A fisherman can be injured by the hook piercing his hand as he removes the fish from the hook. Although there have been various inventions of quick-disconnect devices for attaching the hook to the leader, each of these devices requires that the fisherman place his hands on the shaft of the hook in order to remove it from the end of the fishing line or leader. These devices do not eliminate the problem of handling the hook while it is in the mouth of a live fish.

SUMMARY OF THE INVENTION

It is an object of this invention to provide a fishing apparatus to releasably secure one end of a leader to a fishline, the other end of the leader to be attached to the lure and hook of the fisherman's choice or to an additional length of leader line. The device may be formed in the shape of a lure so that it performs the dual function of a fastener and a lure.

Another object of this invention is to provide a fishing apparatus which substantially eliminates the danger of having the hook pierce the hand of the fisherman when he removes a live fish from the hook by providing a releasable front plate which is a substantial distance away from the hook, the front plate being releasable by the use of finger pressure without the use of tools.

Another object of this invention is to provide a device which is inexpensive to manufacture and is useful to both the novice and experienced fisherman.

These and various other objects and advantages of this invention will be more fully apparent from a consideration of the following description, drawings and appended claims.

BRIEF DESCRIPTION OF THE DRAWINGS

FIG. 1 is a perspective view of the fishing apparat according to this invention showing it attached to fishing line, an additional leader and hook.

FIG. 2 is a top plan view of the back plate.

FIG. 3 is a top plan view of the front plate.

FIG. 4 is a sectional view on line 4—4 of FIG. 2.

FIG. 5 is a sectional view on line 5—5 of FIG. 3.

FIG. 6 is a sectional view on line 6—6 of FIG. 1.

FIG. 7 is a perspective view of a modified form of t invention.

FIG. 8 is a perspective view of another modifi form of the invention.

FIG. 9 is a sectional view of line 9—9 of FIG. 8.

FIG. 10 is a sectional view on line 10—10 of FIG.

DESCRIPTION OF THE PREFERRED EMBODIMENTS

Referring now specifically to the drawings, the n meral 10 designates the fishing apparatus shown in FI( 1. A back plate 11 is formed of rigid or semi-rigid mat rial, such as thin gauge metal, plastic or leather and h an upper end 12, a lower end 13, a front face 14 and back face 15. The back plate 11 is formed with a hole at the upper end through which the fishing line 17 c be tied. The back plate 11 is formed with means releasably secure it to the front plate. The releasat securing member on the back plate 11 may be form with a stem 33 extending outwardly from the front fa 14 with a securing element at the end of the stem. shown in the drawings, two upwardly opened hooks are formed at the end of each stem 33 on the front fa 14 of the back plate 11 in alignment along the cent portion of longitudinal dimension of the back pla Each hook has an upward and inwardly curved porti( 34 extending from the step 33 and an end portion 35 lip substantially adjacent to the front face 14 of the ba plate 11.

The front plate 18 has an upper end 19, a lower e 20, a front face 22, a back face 23 and cooperatii means to releasably secure the front plate to the ba plate. As shown in the drawings, two individual spaced openings, slots or holes 25 are formed throu the center portion of the front plate 18 to fit over t hooks 24 which hold the front plate against the ba plate by frictional engagement of the end portions 35 the hooks 24 against the front face 22 of the front pla 18. While all of the drawings show the use of two hoo and holes to releasably secure the front and back plat it is obvious that any number of hook and hole arrang ments can be used. In practice it has been found th two upwardly opened hooks on the back plate passii through two cooperating holes on the front plate ho the plates together when the fishing line is thrown in the water and when a fish is caught and struggl against the fish hook.

In the alternative many types of snap fasteners m also be used with cooperating parts of the snap fasten mounted on the front face of the back plate 11 and the back face 23 of the front plate 18, respectively. such case one part of the fastener would replace t hooks 24 as shown in the drawings of the back plate and the cooperating fastening pieces would be mount in the openings 25 in the front plate 18 shown in t drawings.

The front plate 18 is formed so that the lower end of the front plate 18 extends below the lower end 13 ick plate 11 to provide an area to grasp the front in order to release it from the back plate. The front 18 is formed of a semi-rigid or moderately flexible ial such as thin gauge metal, plastic, leather or is. The semi-rigid material of the front plate facilits removal from the back plate by permitting the end 20 to bend slightly as it is lifted from the e front plate 18 is also formed with a hole 21 at the r portion of the lower end 20 through which an onal length of leader 26 may be attached by means wivel or other connecting means 28. A lure or bait ooks can be attached to the free end of the leader s shown in FIG. 1, a hook 27 is attached to the end e leader 26. It can be seen from FIG. 1 that the ded lower end 20 of the front plate 18 and addil length of leader 26 provide a considerable disbetween the fastener 10 itself and the fish hook 27. a fish is caught, the entire front plate is quickly ved from the back plate by hand without the use of and a new front plate with a baited hook can be ly attached to the back plate in order to continue g. After the fish has stopped wriggling, the fisher:an remove the hook from its mouth and reuse the plate with its attachments.

r invention can also be made to serve the dual ose of a fastener and a lure. As shown in FIG. 7, the and back plates 18, 11 may be formed to resemble i, with the upper end of the back plate 12 being antially oval in shape and with the lower end of the plate 20, which extends below the back plate 11, ed in the shape of a fish tail 31. A hole 21 is formed center portion of the fish tail 31 to which hooks e attached.

further modification of my device is shown in 3. 8 through 10 wherein the front plate 18 is emd or curved outwardly from the back plate to form iree-dimensional shape of a small fish 29 with the r end or tail 31 extending below the back plate. ipper end 22 of the front plate 29 may be flattened he center portion 32 of the body of the fish may be essed to provide an area to form holes 25 which fit the hooks 24 on the back plate to hold the front plate against the back plate 11 without modification of the structure of the back plate as described above. The upper end 12 of the back plate 11 may be formed in a substantially oval shape to resemble a fish. As indicated for other forms of the invention, a hole 21 is formed in the center area of the tail 31 for the attachment of hooks and other accessories. In the modifications shown in FIGS. 7 through 10, like parts are given the same numeral as shown in FIGS. 1 through 6. It will thus be seen that I have provided a new and improved fishing apparatus for quickly connecting and disconnecting a leader to a fishing line.

I claim:

1. A fishing apparatus comprising:
 (a) a back plate having a front face, a back face, an upper end and a lower end, the upper end being formed with a hole for the attachment to a fishing line;
 (b) at least two members extending from the front face of the back plate, each member having a stem extending outwardly from the front face and each stem having a securing element at its outer end, which element comprises an upwardly opening hook having an upwardly and inwardly curved portion extending from the stem and an end portion substantially adjacent to the front face of the back plate;
 (c) a front plate formed of semi-rigid material having a front face, a back face, an upper end and a lower end, the lower end being formed with a hole, the lower end of the front plate extending below the lower end of the back plate, the front plate being formed with at least two individual spaced openings opposed to the securing elements on the back plate wherein each opening is adapted to fit over the hook to hold the front plate against the back plate by frictional engagement of the end portion of the hook against the front face of the front plate; and
 (d) a leader attached to the lower end of the front plate for the attachment of fishing accessories.

* * * * *